United States Patent [19]

Rusgo

[11] Patent Number: 4,916,847
[45] Date of Patent: Apr. 17, 1990

[54] JIGGING DEVICE

[76] Inventor: David E. Rusgo, 611 Lankamp, NW., Grand Rapids, Mich. 49504

[21] Appl. No.: 293,687

[22] Filed: Jan. 5, 1989

Related U.S. Application Data

[63] Continuation-in-part of Ser. No. 25,404, Mar. 13, 1987, abandoned.

[51] Int. Cl.$^4$ ............................................. A01K 97/10
[52] U.S. Cl. ...................................... 43/19.2; 43/21.2; 43/26.1
[58] Field of Search ...................... 43/19.1, 21.2, 26.1

[56] References Cited

U.S. PATENT DOCUMENTS

| | | | |
|---|---|---|---|
| 3,839,810 | 10/1974 | Lagasse | 43/19.2 |
| 4,388,774 | 6/1983 | Thoemke | 43/21.2 |
| 4,597,215 | 7/1986 | Otremba | 43/26.1 |

Primary Examiner—Kurt Rowan
Attorney, Agent, or Firm—Waters, Morse & Harrington

[57] ABSTRACT

A beam is mounted horizontally for rotative oscillation, preferably across the stern of a boat. The beam is adapted to carry a plurality of rod-holding receptacles oriented transversely to the beam. The beam has a radius arm engaged by an eccentric driven by a gearmotor resulting in the up-down movement of the rod as the beam is rotatively oscillated. This movement of the rods takes place in a vertical plane parallel to the centerline of the boat, and the arrangement permits the lateral separation of the rods necessary to eliminate any overlay of the fishing lines which would be likely to cause them to become entangled. The crank and radius arm mechanism provides an enhanced rod movement, with the rods moving upwardly and downwardly at different rates of speed, which produces enhanced lure movement through the water. This action is adjustable.

9 Claims, 3 Drawing Sheets

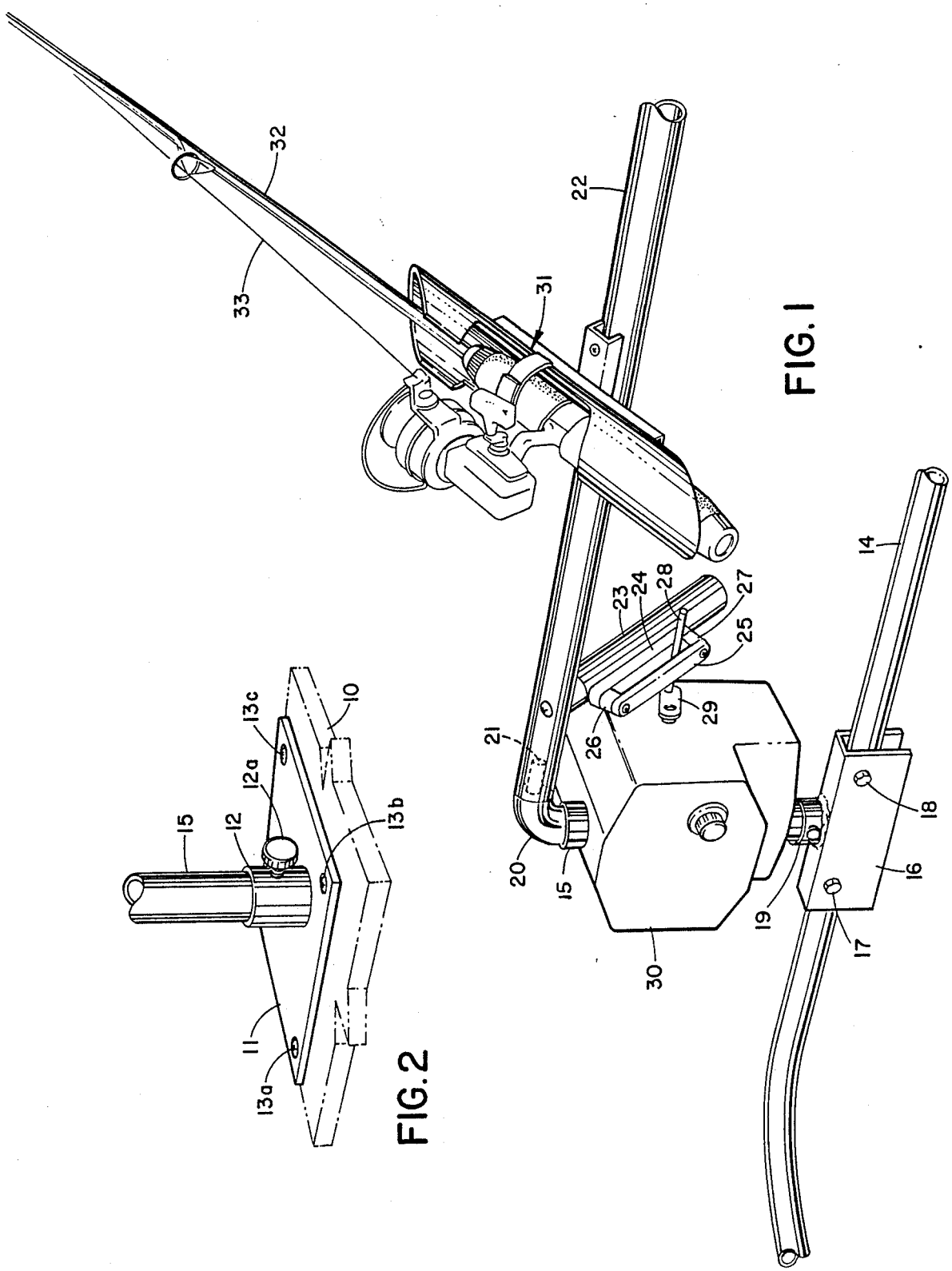

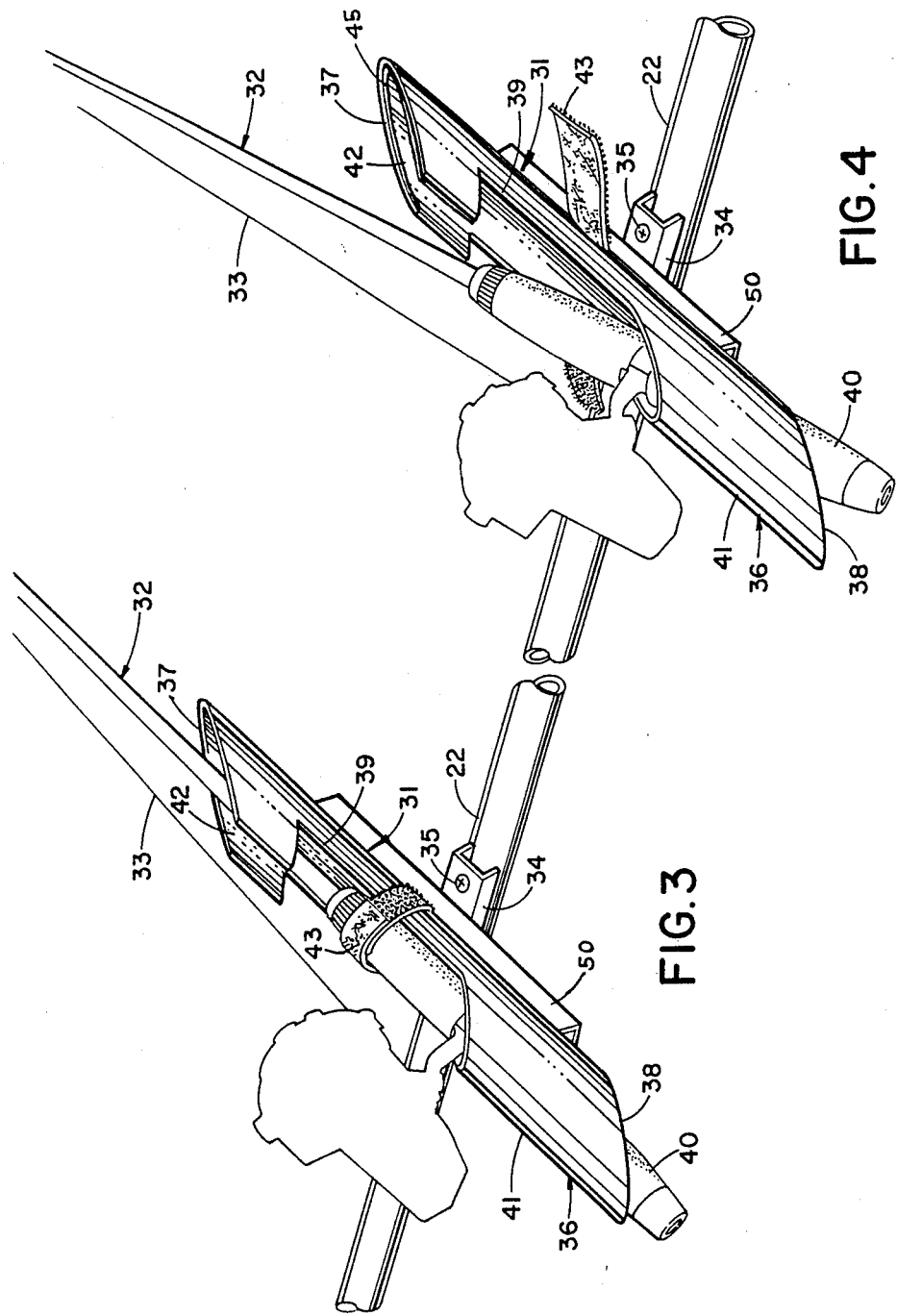

JIGGING DEVICE

RELATED APPLICATION

This application is a continuation-in-part of application Ser. No. 025,404, Filed Mar. 13, 1987, and now abandoned as of the filing of the present application.

BACKGROUND OF THE INVENTION

The endless variety of fishing techniques has produced nothing more productive than the well-known up-down rod movement commonly called "jigging". Apparently, this action keeps the bait in motion, and thus attracts the fish. Many devices have been marketed to perform the jigging action automatically. Most of these have engaged the fish line itself with some sort of oscillating mechanism. Such an arrangement makes it necessary to disengage the line from the mechanism before the fish can be worked with the pole. A few devices have been adapted to oscillate a standard pole, which is obviously preferable. U.S. Pat. Nos. 3,623,259, 3,839,810, and 4,251,939 have been noted as showing this latter type of device. This system has the added advantage of retaining the full resilience of the pole for setting the hook, which often takes place on the upward phase of the jigging movement. The present invention provides these features in a simple and reliable structure.

SUMMARY OF THE INVENTION

A beam is mounted horizontally for rotative oscillation, preferably across the stern of a boat. The beam is adapted to carry a plurality of rod-holding receptacles oriented transversely to the beam. The beam has a radius arm engaged by an eccentric driven by a gearmotor resulting in the up-down movement of the rod as the beam is rotatively oscillated. This movement of the rods takes place in a vertical plane parallel to the centerline of the boat, and the arrangement permits the lateral separation of the rods necessary to eliminate any overlay of the fishing lines which would be likely to cause them to become entangled. The crank and radius arm mechanism provides an enhanced rod movement, with the rods moving upwardly and downwardly at different rates of speed, which produces enhanced lure movement through the water. This action is adjustable.

DESCRIPTION OF THE DRAWINGS

FIG. 1 is a perspective view showing the installation of a jigging device embodying the present invention on a guard rail across the stern of a boat.

FIG. 2 is a fragmentary view showing a mounting base for mounting the jigging device directly on the deck of a boat.

FIGS. 3 and 4 are perspective views showing a pole in the two positions, respectively, usually encountered in the use of a device.

DESCRIPTION OF THE PREFERRED EMBODIMENT

Figure 5:
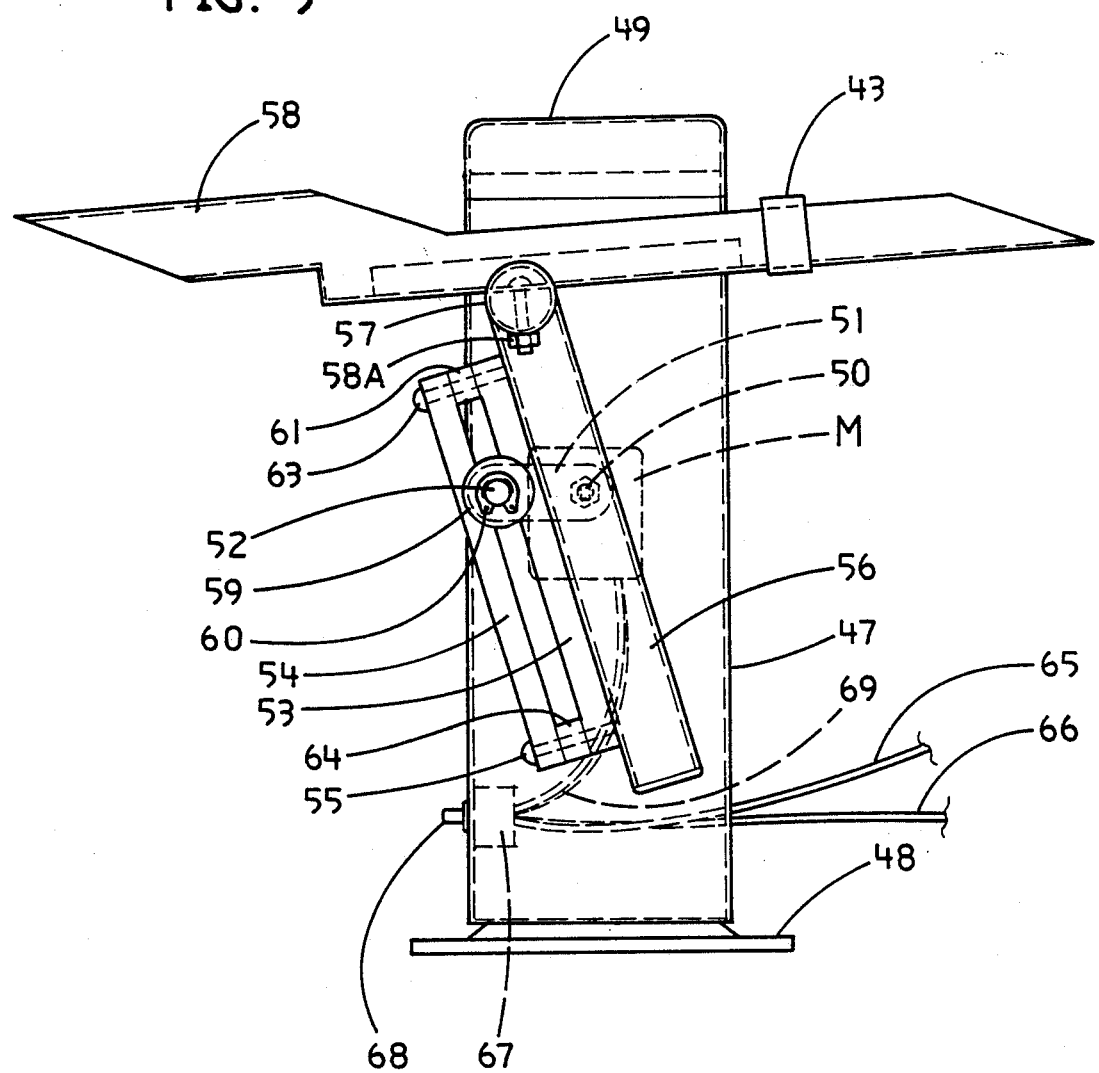
FIG. 5 is a side elevation of a modified form of the device based upon a pedestal structure carrying the oscillating beam, and providing a housing for the oscillating mechanism.

When a jigging device is to be mounted directly on the deck 10 of the boat, as shown in FIG. 2, a flush mounting is formed by a flat base plate 11 carrying a collar 12. The plate 11 is screwed onto the deck by fasteners that fit through openings 13a–c.

FIG. 1 of the drawings shows the installation of a device on a guard rail 14 at the stern of the boat. In the present discussion, terms such as "forward" and "rearward" relate to the direction of movement of the boat. The upright supports 15 can be secured either to the collars 12 shown in FIG. 2, or to the downwardly-facing channel brackets 16, which engage the guard rail 14 at each end of the device. These are secured to the guard rail by bolts as shown at 17 and 18. A tubular socket 19 is welded to each bracket 16, to receive the support members 15. Each of these upright supports is then bolted to an elbow as shown at 20. The elbows have journals 21 engaging bearings (not shown) in the ends of the oscillating tubular beam 22, and permit the tubular beam to rotate with respect to the elbows.

The beam 22 has a radius arm 23 secured in position near one end of the beam. Elongated pieces 24 and 25 of low-friction material such as nylon are secured to the radius arm 23 with spacers 26 and 27 between them to form a slot receiving the stud 28 of a crank 29 rotated by the gear motor 30 mounted on the support post 15. Slow rotative movement of the crank thus induces an oscillating rotative movement of the beam 22. The geometry of this driving relationship inherently produces a very desirable variation in the angular velocity of movement of the rods. It may be assumed that the gear motor rotates the crank 29 at a constant velocity. The closer the member 28 is to the axis of rotation of the beam 22, the greater will be its effect on the velocity of rotation of the beam. Referring to FIG. 1, a rotation of the crank 29 will result in the placement of the member 28 at a wide range of positions along the slot formed by the members 24 and 25. As the member 28 is in the upper portion of the slot, the movement of the member 28 in a tangential relation with respect to the beam 22 will thus induce a maximum rate of rotation of the beam. At the opposite extremity of the slot (as shown in FIG. 1), the tangential component of the movement of the member 28 will induce a much lower velocity of rotation of the rod. The differential in rates between upward and downward rod movement varies by changing the length of the crank arm, the positions of the components and the direction of the rotation of the crank. When a relatively slow upward movement and a more rapid downward movement are selected by imparting a counterclockwise movement to the crank, this produces an enhanced slow down or pause to the lure as the line relaxes at the end of the downward stroke. Depending on trolling speed, the downward rod movement can produce slack in the fishing line which causes the lure to flutter as it pauses. This differential movement produces a more desirable jerky or irregular lure movement through the water. When the crank is rotated in a reverse or clockwise direction to cause a slow downward and a rapid upward rod movement, the lure appears to dart forwardly irregularly. This action facilitates the setting of the hook.

The beam carries transverse rod-holding receptacles as shown at 31, with the rod 32 shown in engagement with the receptacle. The line 33 associated with the rod 32 will thus have the desirable jigging motion imparted to it whenever the gear motor is energized. The gear motor may be of any standard design, and an ordinary windshield wiper motor has been found to be effective for this purpose. Whatever the case, a suitable source of battery power should be available in the boat corresponding to the needs of the gear motor. The extent of the up-down motion can be varied by an appropriate selection of the crank 29, and also by varying the distance between the axis of rotation of the eccentric and the axis of the beam 22. The closer the rotation axis of the crank is to the beam 22, the greater will be the extent of the rotative oscillation for a particular crank. It should also be noted that the increase in the scope of the oscillating movement will also increase its velocity, and these variables are subject to the considered judgment of the particular fisherman.

Referring to FIGS. 3 and 4, the rod-holding bracket 31 includes a channel-shaped based extrusion 34 secured to the beam 22 with screws as shown at 35. The rod receptacle 36 is mounted on the transverse channel member 50 attached to the base 34. Preferably, the receptacle 36 is a length of plastic (PVC) pipe trimmed to a particular configuration. The ends 37 and 38 of the pipe are cut on parallel planes slanted to the axis of the pipe, so that one cut of the pipe material forms one end of one receptacle, and the opposite end of the next one. The incline of the cut places the rearward extremity of the receptacle where it can provide the best support for the outer end of the rod handle, and the upper forward portion of the opposite end of the receptacle where it can provide the best leverage against the inner end of the handle. The amount of leverage provided by the receptacle against the forces applied to the fishing rod are a function of the distance between the extreme ends of the receptacle. This configuration thus provides the most economical use of the material. The cut of the end 38 also allows for the upward pivoting of the rod shown in FIG. 4 without significant interference, so that the handle of the rod can be withdrawn easily when necessary.

A cut-away portion 39 in the central portion of the receptacle receives the rod handle 40, which is then slipped to the FIG. 3 position, where it is embraced by the enclosed portion 41 of the receptacle. The opposite (rearward) portion 42 of the receptacle is open at the top to receive the rod 32. The end configuration and the cut-away portions of the receptacle should be adapted to permit the rod to be pivoted upwardly at least between 20° and 30° so that the fisherman can maintain tension on the line to assist in setting the hook as the rod is removed from the receptacle. The initial diameter of the tube from which the receptacle is cut is also a variable that may be selected with regard to the ease of disengagement of the rod. Until the rod is pulled to the FIG. 4 position, it is held in the receptacle 36 by the disengageable Velcro strip 43. This strip is easily pulled open to release the rod for the hook-setting movement, usually followed by removal of the rod from the receptacle for working the fish. The receptacle can be lined with a resilient cushioning material 45 on the underside of the central and rear portion of the receptacle, and also on the upper interior side of the forward portion, if desired. This material cushions the rod, and provides a resilient and snug fit for the rod in the receptacle. The lining material is best shown in FIG. 4.

Figure 6:
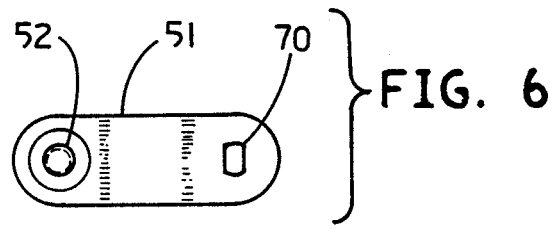
FIG. 6 is a plan view on an enlarged scale of the crank arm associated with the oscillating mechanism.
Figure 7:
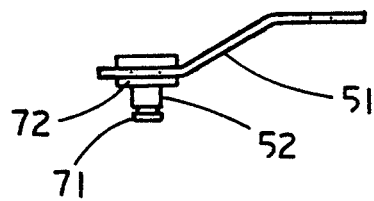
FIG. 7 is an elevation with respect to FIG. 6.

The modification of the invention shown in FIGS. 5-7 has the advantage of being unitary device easily installed on any available horizontal surface at the stern or rail of a boat. The pedestal structure 46 is made from standard components of PVC pipe, including the tubular column 47, the base flange 48, and the end cap 49. The gearmotor M is secured to the inside of the column 47 with conventional fastenings (not shown), with the motor shaft 50 traversing a suitable opening in the wall of the column. The crank arm 51 is fixed with respect to the end of the motor shaft, and the stud 52 at the end of the crank arm traverses the slot 53 formed by the members 54 and 55 secured to the radius arm 56 extending from the oscillating beam 57. This beam extends outwardly from each side of the pedestal about six (6) inches or so carries at least a pair of receptacles, one on each side of the pedestal 46, as shown at 58 in FIG. 5. A transverse recess is machined into the beam 57, and the receptacle is secured there by a bolt 58a as shown. The beam 57 traverses opposite openings in the wall of the column 47, with the thickness of the plastic wall forming bearings for supporting the rotative oscillating movement. Fishing rods mounted in the receptacles extend outwardly to the right as shown in FIG. 5, with the interior of the boat being to the left.

The stud 52 is held in engagement with the slot 53 by the washer 59 removably secured in place with the clip 60. The spacers 61 and 62 maintain the slot width, these components being secured to the radius arm 56 by screws as shown at 63 and 64, possibly supplemented by the application of adhesive between the slot member 55 and the material of the radius arm 56. The wires 65 and 66 are to be connected to a suitable source of electric power in the bolt, and are admitted through an appropriate hole in the side of the tubular column 47. They are attached to the rheostat 67 controlled by the knob 68, so that the motor 50 can be controlled through the leads 69. Adjustment of the knob 68 will thus control the rate of oscillation of the fishing rods.

The details of the crank arm inducing this motion are shown best in FIGS. 6 and 7. The offset strip of steel forming the crank arm 51 has a hole 70 with opposite flat sides for engaging a correspondingly-shaped end of the motor shaft for the transfer of torque. The flat sides machined on the shaft provide shoulders against which the crank arm rests under the action of a conventional nut (not shown) on the motor shaft clamping the crank arm in position. After the stud 52 has been worked through the slot 53, the washer 59 is slipped over the end of the stud 52, and the clip 60 engaged with tee slot 71. Preferably, the assembly includes a spacer 72, which can be a separate washer, or formed integrally with the stud 52. The stud is then either staked or welded to the arm 51.

I claim:

1. A fish line jigging device, comprising:
   a beam having a radius arm;
   means supporting said beam for rotation on a substantially horizontal axis;
   at least one receptacle for fishing rods mounted on said beam; and
   oscillating means adapted to engage said radius arm and induce reciprocating rotation to said beam, said radius arm including means forming a slot substantially radial with respect to said axis, and said oscillating means including a motor having a crank arm with a portion thereof slidably and rotatably engaging said slot, said crank arm rotating on an axis parallel to said beam axis.

2. A device as defined in claim 1 wherein the crank and slot are positioned such that they cause the fishing rods to be rotated upwardly and downwardly at different rates of speed so as to enhance the jerky or irregular movement of the lure through the water.

3. A device as defined in claim 2 wherein the crank and slot are positioned and rotated such that the oscillating means causes the fishing rods to be rotated in an upward direction at a relatively slow rate of speed and a downward direction at a relatively fast rate of speed, producing an enhanced slow down or pause in lure movement as the lure moves through the water.

4. A fish line jigging device, comprising:
an elongated beam having a radius arm;
means supporting said beam for rotation on a substantially horizontal axis;
at least one receptacle for fishing rods mounted on said beam; and
oscillating means adapted to engage said radius arm and induce reciprocating rotation to said beam, and includes means forming a slot substantially radial with respect to said axis, and said oscillating means also including a motor having a crank arm with a portion thereof slidably and rotatably engaging said slot, said crank arm rotating on an axis parallel to said beam axis.

5. A device as defined in claim 4 wherein the crank and slot are positioned such that they cause the fishing rods to be rotated upwardly and downwardly at different rates of speed so as to enhance the jerky or irregular movement of the lure through the water.

6. A device as defined in claim 5 wherein the crank and slot are positioned and rotated such that the oscillating means causes the fishing rods to be rotated in an upward direction at a relatively slow rate of speed and a downward direction at a relatively fast rate of speed, producing an enhanced slow down or pause in lure movement as the lure moves through the water.

7. A receptacle for a fishing rod, said receptacle being formed of a tubular member having the ends thereof disposed in substantially parallel planes inclined at an acute angle to the axis of said member whereby the bottom of the rearward portion of said member provides the extreme rearward end of said member, and the top of the forward portion of said member provides the extreme forward end of said member, the central and rearward portions of said member being cut away along the top thereof to admit a fishing rod with the handle thereof axially engaging said forward portion.

8. A fish line jigging device, comprising:
a pedestal having a mounting base and a tubular portion extending normally upward from said base;
an oscillating beam supported for rotation in said pedestal, said beam having a radius arm; and
oscillating means adapted to reciprocate said beam within a limited freedom of rotary movement, said oscillating means including a motor mounted within said tubular portion and having a motor shaft traversing the wall of said tubular portion, said oscillating means including a crank arm and means operatively connecting said crank arm to said radius arm.

9. A device as defined in claim 8, wherein the material forming the wall of said tubular portion forms bearing means supporting said beam.

* * * * *